United States Patent
Lazarus et al.

(10) Patent No.: US 10,038,376 B2
(45) Date of Patent: Jul. 31, 2018

(54) DC-DC POWER CONVERTER

(71) Applicant: U.S. Army Research Laboratory ATTN: RDRL-LOC-I, Adelphi, MD (US)

(72) Inventors: Nathan S. Lazarus, Bethesda, MD (US); Sarah S. Bedair, Bethesda, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 546 days.

(21) Appl. No.: 14/818,336

(22) Filed: Aug. 5, 2015

(65) Prior Publication Data
US 2017/0040893 A1 Feb. 9, 2017

(51) Int. Cl.
*H02M 3/158* (2006.01)
*H02M 1/00* (2006.01)
*H02M 7/48* (2007.01)

(52) U.S. Cl.
CPC .... *H02M 3/158* (2013.01); *H02M 2001/0058* (2013.01); *H02M 2001/0064* (2013.01); *H02M 2007/4818* (2013.01); *Y02B 70/1441* (2013.01); *Y02B 70/1491* (2013.01)

(58) Field of Classification Search
CPC .................................................. H02M 3/158
USPC ........................................................ 307/98
See application file for complete search history.

(56) References Cited

U.S. PATENT DOCUMENTS

| | | | | |
|---|---|---|---|---|
| 5,243,229 A | * | 9/1993 | Gabara | H03K 19/0005 307/98 |
| 7,479,713 B2 | * | 1/2009 | Tanner | G06F 1/26 307/31 |
| 8,466,730 B2 | * | 6/2013 | Terazawa | F02M 27/04 307/98 |
| 2010/0033157 A1 | * | 2/2010 | Sander | H02M 3/155 323/351 |
| 2014/0028393 A1 | * | 1/2014 | Chakrabarti | H03F 3/2176 330/251 |

* cited by examiner

*Primary Examiner* — Joseph Chang
(74) *Attorney, Agent, or Firm* — Alan I. Kalb

(57) ABSTRACT

A DC-DC power converter having a power source, a load, and a transmission line terminated at one end. A first switch is electrically connected between the power source and the second end of the transmission line. A second switch is electrically connected between the second end of the transmission line and the load and both switches are movable between an open and a closed position. A switch control circuit switches the first and second electric switches between their open and closed positions at a selected high frequency. A plurality of variable impedance elements are electrically connected to the transmission line at spaced intervals while an impedance control circuit is electrically connected to the variable impedance elements to vary the impedance of the impedance elements and thereby vary the voltage applied to the load.

8 Claims, 1 Drawing Sheet

DC-DC POWER CONVERTER

GOVERNMENT INTEREST

The invention described herein may be manufactured, used, and licensed by or for the United States Government.

BACKGROUND OF THE INVENTION

I. Field of the Invention

The present invention relates generally to power converters and, more particularly, to a DC-DC switching power converter.

II. Description of Related Art

There are many types of previously known power supplies. One type of previously known power supply is a linear power supply which utilizes a transformer to convert the voltage from one level to another level. Such linear power supplies are advantageous since the range of conversion, both up and down, of the voltage from the power source and to the load may be varied over an almost infinite range. A disadvantage of the previously known linear power supplies, however, is that they require a large and heavy transformer for the conversion. As such, such linear power supplies are ill suited for many applications, such as small electronic devices, cellular phones, etc. A still further disadvantage of the previously known linear power supplies is that they are relatively inefficient in operation and dissipate heat due to that inefficiency.

There have, however, been previously known switching power supplies which do not require a transformer for the voltage conversion between the source and the load. Such switching power supplies, also known as boost converters, utilize a voltage storage device, such as an inductor, which is charged at a high frequency rate and, when charged to the desired voltage, discharge it to the load. Furthermore, in order to change the output voltage ultimately discharged to the load, a switch control circuit changes the frequency at which the energy storage device is charged to thereby vary the output voltage to the load.

In one type of previously known power converter, a transmission line is used to store the electrical power which is ultimately discharged to the load. In these previously known converters, a power source is selectively connected through a first switch to one end of the transmission line while the second end of the transmission line is terminated, typically by ground. A second switch then selectively electrically connects the other end of the transmission line to the load.

In operation, the first switch is opened and closed at a sufficiently high frequency to generate a wave signal through the transmission line. The transmission line terminates in an impedance mismatch so that the wave generated in the transmission line propagates between the ends of the transmission line thus increasing the amount of power stored within the transmission line. Ultimately, with the first switch in an open position, the second switch is closed thus applying the power accumulated to the load at a voltage level higher than the voltage source.

In order to vary the voltage gain of the power converter, the switch frequency of the second switch, which electrically connects the transmission line to the load when closed, is varied. Consequently, if the propagating wave in the transmission line has less time to accumulate, the amount of accumulated charge changes thus reducing the output voltage. Conversely, if the propagating wave has more time to accumulate within the transmission line, the amount of accumulated charge increases, thus increasing the output voltage applied to the load.

These types of previously known DC-DC converters utilizing a transmission line as the energy storage device, however, suffer from several major disadvantages. One disadvantage is that, since the generating signals to control the switching frequency of the second switch may vary over a wide range, the complexity of the circuitry of the switch control likewise increases. This may also increase the number of discrete passive components which can significantly increase the overall size of the system and render the DC-DC converter unusable for small electronic devices.

SUMMARY OF THE PRESENT INVENTION

The present invention provides a DC-DC power converter which utilizes a transmission line and overcomes the previously known disadvantages of the previously known DC-DC converters which use a transmission line to store the power.

In brief, in the present invention, as in the standard DC-DC converter utilizing a transmission line as the storage device, a first switch electrically connects the source to one end of the transmission line while the other end of the transmission line is terminated, typically at ground. A second switch is then connected between the first end of the transmission line and the load.

Unlike the previously known transmission lines for power converters, in the present invention a plurality of variable impedance devices, such as variable inductors or variable capacitors, are electrically connected to the transmission line at spaced intervals. At high frequencies, e.g. 10 megahertz, the phase velocity of the transmission line may be varied by changing the magnitude of the distributed impedance devices along the transmission line. This allows the switches for connecting the transmission line to both the power source as well as the load to be operated at an optimum frequency but still permitting the voltage output of the power converter to be varied by changing the impedance of the impedance devices.

In one form of the invention, the impedance device comprises a MEMS (microelectromechanical system) variable capacitor. As such, a separate control circuit for the impedance devices varies the voltage applied to the MEMS device to thereby vary the impedance. Variation of the impedance of the impedance devices varies the amount of propagation of the wave through the transmission line between its ends to thus vary the voltage output from the transmission line which is applied to the load.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE INVENTION

Figure 1:
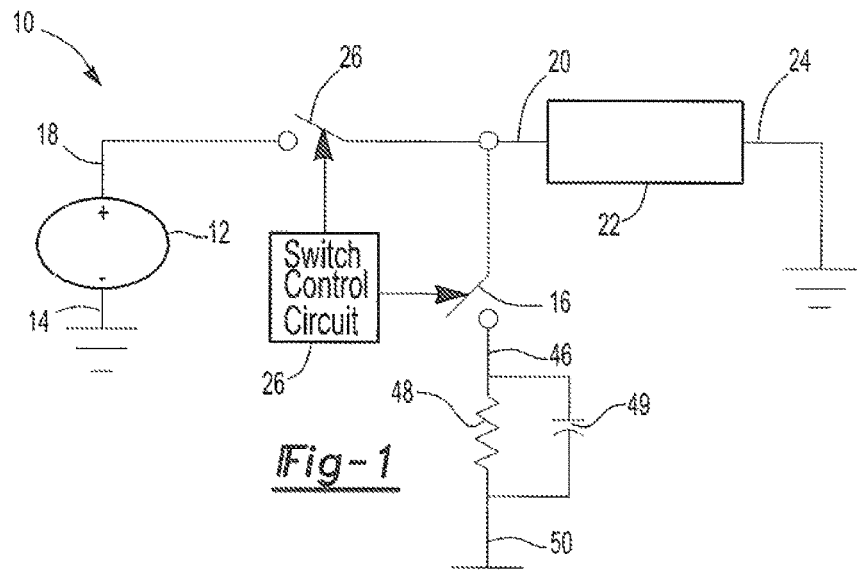
FIG. 1 is a schematic view illustrating a DC-DC power converter according to the present invention.

With reference first to FIG. 1, a block diagram view of a DC-DC power converter 10 is illustrated. The power converter 10 includes a voltage source 12, such as a DC power source, having one terminal 14 grounded. The power source 12, furthermore, may be of any conventional design, such as a DC battery or the like.

A first switch 16 is movable between an open and a closed position. In its closed position, the switch 16 electrically connects a second terminal 18 of the voltage source 12 to one end 20 of a transmission line 22. A second end 24 of the transmission line 22 is terminated, typically by ground. Consequently, an impedance mismatch is created at each end 20 and 24 of the transmission line 22.

A switch control circuit 26 controls the opening and closure of the first switch 16. Preferably, the first switch 16 comprises a transistor, such as a field effect transistor, and the switch control circuit switches the transistor at a high frequency rate, e.g. 10 megahertz. Upon each closure of the first switch 16, the terminal 18 from the voltage source 12 is applied to the end 20 of the transmission line 22.

Figure 2:
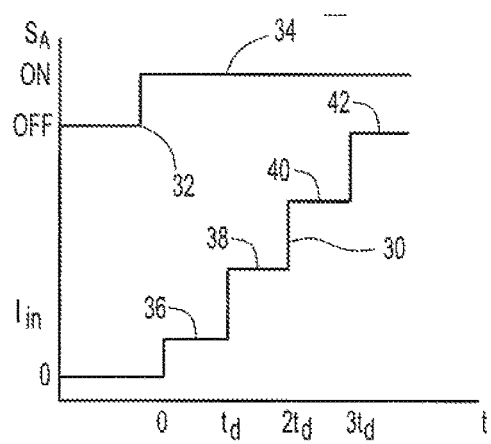
FIG. 2 is a graph illustrating the charging of the transmission line.

With reference now to FIGS. 1 and 2, the frequency of the voltage supplied by the switch 16 to the transmission line 22 is sufficiently high so that a wave is propagated through the transmission line. Once the wave contacts the second end 24 of the transmission line 22, the wave is reflected back toward the first end 20 of the transmission line 22. In this fashion, charge continues to accumulate within the transmission line 22 as long as the switch 16 is opened and closed at a high frequency by the switch control circuit 26.

With reference to FIG. 2, the accumulation of the charge within the transmission line 22 is illustrated by graph 30. As can be Seen from FIG. 2, upon the closure of the switch 16 as indicated by point 32 of a switch on/off graph 34, charge begins to accumulate in the transmission line 22 as indicated in a first step 36 of the graph 30. Each reflection of the wave in the transmission line 22 successively stores more charge within the transmission line 22 as shown by steps 38, 40, and 42 of graph 30. Consequently, the total amount of charge stored within the transmission line 22 is directly related to the number of reflections of the wave between the ends 20 and 24 of the transmission line 22.

With reference again to FIG. 1 after the desired amount of charge has accumulated within the transmission line 22 and with the first switch 16 open, the switch control circuit 26 closes a second switch 44 and electrically connects the first end 20 of the transmission line 22 to one end 46 of a load 48 having its second end 50 grounded and a parallel capacitor 49. Consequently, the actual voltage applied to the load 48 constitutes a multiple of the voltage of the voltage source 12 which, in turn, is equal to the number of propagations of the wave between the ends 20 and 24 of the transmission line 22.

Unlike the previously known power converters which utilize a transmission line to store the static charge, in the present invention a plurality of Variable impedance devices 52 are electrically connected to the transmission line 22 at spaced intervals along the transmission line 22. These variable impedance devices 52 may comprise, for example, variable capacitors or variable inductors.

Figure 3:
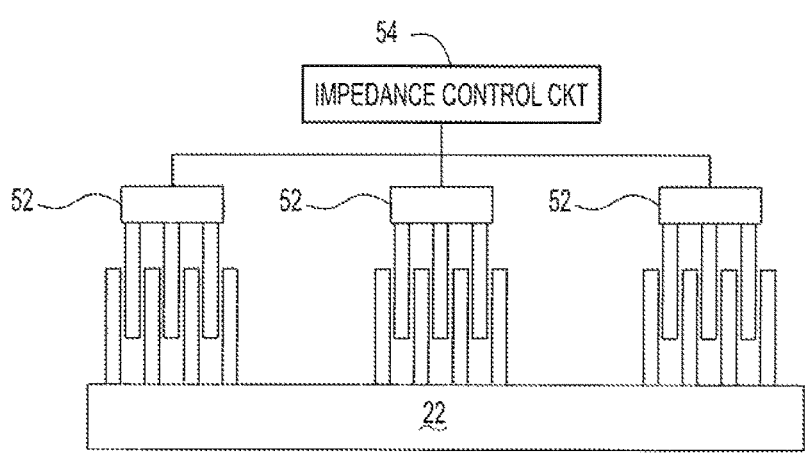
FIG. 3 is a diagrammatic view illustrating the transmission line.

However, as shown in FIG. 3, the variable impedance device 52 is illustrated as a variable capacitor. Preferably, the variable impedance devices 52 are MEMS devices so that the impedance of each impedance device 52 is controlled by an impedance control circuit 54.

The variable impedance devices 52 are all varied simultaneously in the same magnitude. Furthermore, variation of the impedance of the impedance devices 52 effectively varies the time delay of the propagation of the wave through the transmission line 22. This, in turn, varies the number of iterations of the wave propagation between the ends 20 and 24 of the transmission line 22 at a fixed frequency this varying the voltage output applied to the load 48.

Consequently, the output voltage applied to the load 48 may be effectively varied by varying the impedance of the impedance devices 52 without changing the frequency of the switch control circuit 26. As such, the switch control circuit 26, which need only generate a fixed frequency signal, is very simple in construction and less complex than the previously known switch control circuits which Varied the frequency to vary the voltage of the DC-DC voltage conversion.

Having described my invention, however, many modifications thereto will be on apparent to those skilled in the art to which it pertains without deviation from the spirit of the invention as defined by the scope of the appended claims.

We claim:

1. A DC-DC power converter comprising:
   a power source,
   a load and a parallel capacitor,
   a transmission line terminated at one end,
   a first switch electrically connected between said power source and a second end of said transmission line and movable between an open and a closed position,
   a second switch electrically connected between said second end of said transmission line and said load and movable between an open and a closed position,
   a switch control circuit for switching said first and second switches between said open and said closed position, said first switch being actuated between said open and said closed position at a sufficiently high frequency so that a wave is propagated through said transmission line,
   a plurality of variable impedance elements electrically connected to said transmission line at spaced intervals,
   an impedance control circuit electrically connected to said variable impedance elements to vary the impedance of said impedance elements to thereby vary the voltage to said load.

2. The DC-DC power converter as defined in claim 1 wherein said first switch comprises a transistor and said second switch comprises a transistor.

3. The DC-DC power converter as defined in claim 1 wherein said impedance elements comprise variable capacitors.

4. The DC-DC power converter as defined in claim 3 wherein said impedance elements comprise variable inductors.

5. The DC-DC power converter as defined in claim 3 wherein said variable capacitors each comprises a MEMS device.

6. The DC-DC power converter as defined in claim 1 wherein said switch control circuit comprises a function generator having an output connected as an input signal to said first transistor and an inverse output connected as an input signal to said second transistor.

7. The DC-DC power converter as defined in claim 2 wherein said first and second transistors are field effect transistors.

8. The DC-DC power converter as defined in claim 1 wherein said one end of said transmission line is terminated at ground.

* * * * *